(12) United States Patent
Keyes

(10) Patent No.: US 6,781,620 B1
(45) Date of Patent: Aug. 24, 2004

(54) MIXED-ELEMENT STITCHING AND NOISE REDUCTION SYSTEM

(75) Inventor: Michael P. Keyes, Round Rock, TX (US)

(73) Assignee: Eastman Kodak Company, Rochester, NY (US)

(*) Notice: Subject to any disclaimer, the term of this patent is extended or adjusted under 35 U.S.C. 154(b) by 0 days.

(21) Appl. No.: 09/270,285

(22) Filed: Mar. 16, 1999

(51) Int. Cl.[7] .......................... H04N 1/04; H04N 1/46
(52) U.S. Cl. ...................................... 348/96; 358/506
(58) Field of Search ............................. 348/95, 96, 97, 348/98, 362; 358/487, 450, 506, 509, 475; 382/284; 355/24, 402; 356/443, 444, 493; 396/575, 564; H04N 7/04, 1/46

(56) References Cited

U.S. PATENT DOCUMENTS

| | | | |
|---|---|---|---|
| 2,404,138 A | 7/1946 | Mayer | 95/94 |
| 3,520,689 A | 7/1970 | Nagae et al. | 96/55 |
| 3,520,690 A | 7/1970 | Nagae et al. | 96/55 |
| 3,587,435 A | 6/1971 | Chioffe | 95/89 |
| 3,615,479 A | 10/1971 | Kohler et al. | 96/48 |
| 3,615,498 A | 10/1971 | Aral | 96/55 |
| 3,617,282 A | 11/1971 | Bard | 96/59 |
| 3,747,120 A | 7/1973 | Stemme | 346/75 |
| 3,833,161 A | 9/1974 | Krumbein | 226/92 |
| 3,903,541 A | 9/1975 | Von Meister et al. | 354/317 |
| 3,946,398 A | 3/1976 | Kyser et al. | 346/1 |
| 3,959,048 A | 5/1976 | Stanfield et al. | 156/94 |
| 4,026,756 A | 5/1977 | Stanfield et al. | 156/554 |
| 4,081,577 A | 3/1978 | Horner | 427/424 |
| 4,142,107 A | 2/1979 | Hatzakis et al. | 250/571 |
| 4,215,927 A | 8/1980 | Grant et al. | 354/317 |
| 4,249,985 A | 2/1981 | Stanfield | 156/554 |
| 4,265,545 A | 5/1981 | Slaker | 356/431 |
| 4,301,469 A | 11/1981 | Modeen et al. | 358/75 |
| 4,490,729 A | 12/1984 | Clark et al. | 346/75 |
| 4,501,480 A | 2/1985 | Matsui et al. | 354/298 |
| 4,564,280 A | 1/1986 | Fukuda | 354/317 |
| 4,594,598 A | 6/1986 | Iwagami | 346/140 |

(List continued on next page.)

FOREIGN PATENT DOCUMENTS

| | | | | |
|---|---|---|---|---|
| EP | 0 261 782 A2 | 8/1987 | | H04N/1/46 |
| EP | 0 422 220 A1 | 3/1989 | | A61B/6/03 |
| EP | 0 482 790 B1 | 9/1991 | | H04N/1/40 |

(List continued on next page.)

OTHER PUBLICATIONS

"Adaptive Fourier Threshold Filtering: A Method to Reduce Noise and Incoherent Artifacts in High Resolution Cardiac Images", Doyle, M., et al., 8306 Magnetic Resonance in Medicine 31, No. 5, Baltimore, MD, May, pp. 546–550, 1994.

(List continued on next page.)

Primary Examiner—Tung T. Vo
(74) Attorney, Agent, or Firm—Raymond M. Galasso; David A. Novais

(57) ABSTRACT

A mixed-element stitching and noise reduction system includes apparatus and methods for producing an image dataset having a reduced noise content without substantially impacting image reproduction accuracy. Such noise reduction is provided by replacing a portion of a first, higher noise image dataset with a portion of a second, lower noise dataset. In a preferred embodiment, two image datasets comprising a color-stitched image and a luminance image are received from a DFP image capturing system. The received images are preferably separately stitched and separately converted to a color-space in which a luminance data channel is separated from image color information. The luminance channel of the luminance image is then preferably substituted for the luminance channel of the color-stitched image. More preferably, a log-time stitching technique is used and the stitched images are each converted to an L*a*b* color space.

17 Claims, 7 Drawing Sheets

U.S. PATENT DOCUMENTS

| | | | | |
|---|---|---|---|---|
| 4,621,037 A | 11/1986 | Kanda et al. | ............... | 430/30 |
| 4,623,236 A | 11/1986 | Stella | ............... | 354/318 |
| 4,633,300 A | 12/1986 | Sakai | ............... | 358/41 |
| 4,636,808 A | 1/1987 | Herron | ............... | 346/75 |
| 4,666,307 A | 5/1987 | Matsumoto et al. | ............... | 356/404 |
| 4,670,779 A | 6/1987 | Nagano | ............... | 358/75 |
| 4,736,221 A | 4/1988 | Shidara | ............... | 354/317 |
| 4,741,621 A | 5/1988 | Taft et al. | ............... | 356/376 |
| 4,745,040 A | 5/1988 | Levine | ............... | 430/21 |
| 4,755,844 A | 7/1988 | Tsuchiya et al. | ............... | 354/317 |
| 4,777,102 A | 10/1988 | Levine | ............... | 430/21 |
| 4,796,061 A | 1/1989 | Ikeda et al. | ............... | 355/73 |
| 4,814,630 A | 3/1989 | Lim | ............... | 250/578 |
| 4,821,114 A | 4/1989 | Gebhardt | ............... | 358/75 |
| 4,845,551 A | 7/1989 | Matsumoto | ............... | 358/80 |
| 4,851,311 A | 7/1989 | Millis et al. | ............... | 430/30 |
| 4,857,430 A | 8/1989 | Millis et al. | ............... | 430/30 |
| 4,875,067 A | 10/1989 | Kanzaki et al. | ............... | 354/325 |
| 4,969,045 A | 11/1990 | Haruki et al. | ............... | 358/228 |
| 4,994,918 A | 2/1991 | Lingemann | ............... | 358/214 |
| 5,027,146 A | 6/1991 | Manico et al. | ............... | 354/299 |
| 5,034,767 A | 7/1991 | Netz et al. | ............... | 354/317 |
| 5,101,286 A | 3/1992 | Patton | ............... | 358/487 |
| 5,124,216 A | 6/1992 | Giapis et al. | ............... | 430/30 |
| 5,155,596 A | 10/1992 | Kurtz et al. | ............... | 358/214 |
| 5,191,645 A * | 3/1993 | Carlucci et al. | ............... | 395/159 |
| 5,196,285 A | 3/1993 | Thomson | ............... | 430/30 |
| 5,200,817 A | 4/1993 | Birnbaum | ............... | 358/80 |
| 5,212,512 A | 5/1993 | Shiota | ............... | 354/319 |
| 5,231,439 A | 7/1993 | Takahashi et al. | ............... | 354/313 |
| 5,235,352 A | 8/1993 | Pies et al. | ............... | 346/140 |
| 5,255,408 A | 10/1993 | Blackman | ............... | 15/308 |
| 5,266,805 A | 11/1993 | Edgar | ............... | 250/330 |
| 5,267,030 A | 11/1993 | Giorgianni et al. | ............... | 358/527 |
| 5,292,605 A | 3/1994 | Thomson | ............... | 430/30 |
| 5,296,923 A | 3/1994 | Hung | ............... | 358/527 |
| 5,334,247 A | 8/1994 | Columbus et al. | ............... | 118/411 |
| 5,350,651 A | 9/1994 | Evans et al. | ............... | 430/21 |
| 5,350,664 A | 9/1994 | Simons | ............... | 430/362 |
| 5,357,307 A | 10/1994 | Glanville et al. | ............... | 354/324 |
| 5,360,701 A | 11/1994 | Elton et al. | ............... | 430/501 |
| 5,371,542 A | 12/1994 | Pauli et al. | ............... | 348/262 |
| 5,391,443 A | 2/1995 | Simons et al. | ............... | 430/21 |
| 5,414,779 A | 5/1995 | Mitch | ............... | 382/199 |
| 5,416,550 A | 5/1995 | Skye et al. | ............... | 354/298 |
| 5,418,119 A | 5/1995 | Simons | ............... | 430/507 |
| 5,418,597 A | 5/1995 | Lahcanski et al. | ............... | 355/76 |
| 5,432,579 A | 7/1995 | Tokuda | ............... | 354/293 |
| 5,436,738 A | 7/1995 | Manico | ............... | 358/503 |
| 5,440,365 A | 8/1995 | Gates et al. | ............... | 354/298 |
| 5,447,811 A | 9/1995 | Buhr et al. | ............... | 430/20 |
| 5,448,380 A | 9/1995 | Park | ............... | 358/520 |
| 5,452,018 A | 9/1995 | Capitant et al. | ............... | 348/651 |
| 5,465,155 A | 11/1995 | Edgar | ............... | 358/500 |
| 5,477,345 A | 12/1995 | Tse | ............... | 358/500 |
| 5,496,669 A | 3/1996 | Pforr et al. | ............... | 430/22 |
| 5,516,608 A | 5/1996 | Hobbs et al. | ............... | 430/30 |
| 5,519,510 A | 5/1996 | Edgar | ............... | 358/471 |
| 5,546,477 A | 8/1996 | Knowles et al. | ............... | 382/242 |
| 5,550,566 A | 8/1996 | Hodgson et al. | ............... | 345/202 |
| 5,552,904 A | 9/1996 | Ryoo et al. | ............... | 358/518 |
| 5,563,717 A | 10/1996 | Koeng et al. | ............... | 358/406 |
| 5,568,270 A | 10/1996 | Endo | ............... | 358/298 |
| 5,576,836 A | 11/1996 | Sano et al. | ............... | 358/302 |
| 5,581,376 A | 12/1996 | Harrington | ............... | 358/518 |
| 5,587,752 A | 12/1996 | Petruchik | ............... | 396/315 |
| 5,596,415 A | 1/1997 | Cosgrove et al. | ............... | 358/296 |
| 5,627,016 A | 5/1997 | Manico | ............... | 430/434 |
| 5,649,260 A | 7/1997 | Wheeler et al. | ............... | 396/569 |
| 5,664,253 A | 9/1997 | Meyers | ............... | 396/603 |
| 5,664,255 A | 9/1997 | Wen | ............... | 396/627 |
| 5,667,944 A | 9/1997 | Reem et al. | ............... | 430/359 |
| 5,678,116 A | 10/1997 | Sugimoto et al. | ............... | 396/611 |
| 5,691,118 A | 11/1997 | Haye | ............... | 430/357 |
| 5,695,914 A | 12/1997 | Simon et al. | ............... | 430/379 |
| 5,698,382 A | 12/1997 | Nakahanada et al. | ............... | 430/418 |
| 5,726,773 A | 3/1998 | Mehlo et al. | ............... | 358/474 |
| 5,739,897 A | 4/1998 | Frick et al. | ............... | 355/40 |
| 5,771,107 A | 6/1998 | Fujimoto et al. | ............... | 358/464 |
| 5,790,277 A | 8/1998 | Edgar | ............... | 358/487 |
| 5,835,795 A | 11/1998 | Craig et al. | ............... | 396/6 |
| 5,835,811 A | 11/1998 | Tsumura | ............... | 396/598 |
| 5,870,172 A | 2/1999 | Blume | ............... | 355/27 |
| 5,880,819 A | 3/1999 | Tanaka et al. | ............... | 355/75 |
| 5,892,595 A | 4/1999 | Yamakawa et al. | ............... | 358/530 |
| 5,930,388 A | 7/1999 | Murakami et al. | ............... | 382/167 |
| 5,959,720 A | 9/1999 | Kwon et al. | ............... | 355/38 |
| 5,963,662 A | 10/1999 | Vachtsevanos et al. | ............... | 382/150 |
| 5,966,465 A | 10/1999 | Keith et al. | ............... | 382/232 |
| 5,979,011 A | 11/1999 | Miyawaki et al. | ............... | 15/308 |
| 5,982,936 A | 11/1999 | Tucker et al. | ............... | 382/233 |
| 5,982,937 A | 11/1999 | Accad | ............... | 382/239 |
| 5,982,941 A | 11/1999 | Loveridge et al. | ............... | 382/260 |
| 5,982,951 A | 11/1999 | Katayama et al. | ............... | 382/284 |
| 5,988,896 A | 11/1999 | Edgar | ............... | 396/604 |
| 5,991,444 A | 11/1999 | Burt et al. | ............... | 382/232 |
| 5,998,109 A | 12/1999 | Hirabayashi | ............... | 430/434 |
| 6,000,284 A | 12/1999 | Shin et al. | ............... | 73/150 |
| 6,005,987 A | 12/1999 | Nakamura et al. | ............... | 382/294 |
| 6,065,824 A | 5/2000 | Bullock et al. | ............... | 347/19 |
| 6,069,714 A | 5/2000 | Edgar | ............... | 358/487 |
| 6,088,084 A | 7/2000 | Nishio | ............... | 355/75 |
| 6,089,687 A | 7/2000 | Helterline | ............... | 347/7 |
| 6,101,273 A | 8/2000 | Matama | ............... | 382/169 |
| 6,102,508 A | 8/2000 | Cowger | ............... | 347/7 |
| 6,137,965 A | 10/2000 | Burgeios et al. | ............... | 396/626 |
| 6,200,738 B1 | 3/2001 | Takano et al. | ............... | 430/362 |
| 6,404,516 B1 * | 6/2002 | Edgar | ............... | 358/487 |

FOREIGN PATENT DOCUMENTS

| | | | | |
|---|---|---|---|---|
| EP | 0 525 886 A3 | 7/1992 | ............... | G03D/5/00 |
| EP | 0 580 293 A1 | 6/1993 | ............... | H04N/1/04 |
| EP | 0 580 293 A1 | 1/1994 | ............... | H04N/1/04 |
| EP | 0 601 364 A1 | 6/1994 | ............... | H04N/1/387 |
| EP | 0 669 753 A2 | 2/1995 | ............... | H04N/1/407 |
| EP | 0 794 454 A2 | 2/1997 | ............... | G03B/27/73 |
| EP | 0 768 571 A2 | 4/1997 | ............... | G03D/13/00 |
| EP | 0 806 861 A1 | 11/1997 | ............... | H04N/1/00 |
| EP | 0 878 777 A2 | 11/1998 | ............... | G06T/5/40 |
| EP | 0 930 498 A2 | 12/1998 | ............... | G01N/21/88 |
| WO | WO 90/01240 | 2/1990 | ............... | H04N/1/40 |
| WO | WO 91/09493 | 6/1991 | ............... | H04N/5/217 |
| WO | WO 97/25652 | 7/1997 | ............... | G03D/5/00 |
| WO | WO 98/19216 | 5/1998 | ............... | G03C/5/29 |
| WO | WO 98/25399 | 6/1998 | ............... | H04N/1/38 |
| WO | WO 98/31142 | 7/1998 | ............... | H04N/5/253 |
| WO | WO 98/34157 | 8/1998 | | |
| WO | WO 98/34397 | 8/1998 | | |
| WO | WO 99/43148 | 8/1999 | ............... | H04N/1/00 |
| WO | WO 99/43149 | 8/1999 | ............... | H04N/1/100 |
| WO | WO 01/01197 | 1/2001 | ............... | G03D/5/00 |
| WO | WO 01/13174 A1 | 2/2001 | ............... | G03D/5/06 |
| WO | WO 01/45042 A1 | 6/2001 | ............... | G06T/5/00 |
| WO | WO 01/50192 A1 | 7/2001 | ............... | G03C/7/407 |
| WO | WO 01/50193 A1 | 7/2001 | ............... | G03C/7/407 |
| WO | WO 01/50194 A1 | 7/2001 | ............... | G03C/7/407 |
| WO | WO 01/50197 A1 | 7/2001 | ............... | G03C/7/42 |
| WO | WO 01/52556 A2 | 7/2001 | ............... | H04N/9/11 |

OTHER PUBLICATIONS

"Anisotropic Spectral Magnitude Estimation Filters for Noise Reduction and Image Enhancement", Aich, T., et al., Philips GmbH Research Laboratories, IEEE, pp. 335–338, 1996.

"Adaptive–neighborhood filtering of images corrupted by signal–dependent noise", Rangayyan, R., et al., Applied Optics, vol. 37, No. 20, pp. 4477–4487, Jul. 10, 1998.

"Grayscale Characteristics", The Nature of Color Images, Photographic Negatives, pp. 163–168.

"Parallel Production of Oligonucleotide Arrays Using Membranes and Reagent Jet Printing", Stimpson, D., et al., Research Reports, BioTechniques, vol. 25, No. 5, pp. 886–890, 1998.

"Low–Cost Display Assembly and Interconnect Using InkJet Printing Technology", Hayes, D. et al., Display Works '99, MicroFab Technologies, Inc., pp. 1–4, 1999.

"Ink–Jet Based Fluid Microdispensing in Biochemical Applications", Wallace, D., MicroFab Technologies, Inc., Laboratory Automation News, vol. 1, No. 5, pp. 6–9, Nov., 1996.

"Protorealistic Ink–Jet Printing Through Dynamic Spot Size Control", Wallace, D., Journal of Imaging Science and Technology, vol. 40, No. 5, pp. 390–395, Sep./Oct. 1996.

"MicroJet Printing of Solder and Polymers for Multi–Chip Modules and Chip–Scale Package", Hayes, D., et al., Micro-Fab Technologies, Inc.

"A Method of Characterisstics Model of a Drop–on–Demand Ink–Jet Device Using an Integral Method Drop Formation Model", Wallace, D., MicroFab Technologies, Inc., The American Society of Mechanical Engineers, Winter Annual Meeting, pp. 1–9, Dec. 10–15, 1989.

"Digital Imaging Equipment White Papers", Putting Damaged Film on ICE, www.nikonusa.com/reference/whitepapers/imaging, Nikon Corporation, Nov. 28, 2000.

* cited by examiner

MIXED-ELEMENT STITCHING AND NOISE REDUCTION SYSTEM

FIELD OF THE INVENTION

The present invention relates generally to digital film developing/processing and more particularly, to apparatus and methods for timed-scan image stitching and noise reduction.

BACKGROUND OF THE INVENTION

Digital film processing ("DFP") promises several advantages over traditional "darkroom" film development techniques, including more accurate image reproduction, defect correction, and image processing, among others A DFP system for capturing an image recorded on photographic film is illustrated in FIG. 1, which figure is taken from FIG. 9 of U.S. Pat. No. 5,519,510. As shown, conventional color photographic film 101 typically includes three film layers, each of which is constructed to record different primary color information (i.e. red, green and blue color information) of a source image during picture taking.

In one aspect of the '510 patented invention, the DFP system captures image information from film 101 by projecting infrared light 11 and 12 at and correspondingly scanning reflected and/or transmitted light from successive portions while the film is being developed with a monochromatic developer. A complete image dataset is formed by capturing successive image portions of successive film layers and then repeating this process at multiple times while film 101 is developed.

For example, scanning a three-layer film 101 includes capturing reflected light 11 from a portion (e.g. portion 11a) of a first or "front" film layer 111 and capturing reflected light 12 from a corresponding portion (e.g. portion 12a) in a third or "back" film layer 113. Such scanning also includes capturing a corresponding portion (e.g. portion 11a) in the second (i.e. "middle" or "through") layer by scanning transmitted light 11 passing through film 101, and then subtracting scanned front layer and back layer values for corresponding front layer and back layer portion scans. A complete image dataset therefore includes front-layer, through-layer and back-layer image pixel data for each portion of the recorded image (in each film layer) at each scan-time during film development.

As shown in FIGS. 2A through 3, multiple scans at increasing times during film development ("timed-scans") are used to enable more accurate reproduction of a source image. Beginning with FIG. 2A, during picture taking with camera 210, a single image 201 recorded onto film 101 (FIG. 1) will typically include discernable picture elements such as highlights 211a, midtones 21b and shadows 211c. Turning to FIG. 2B, during development of film 101, an early scan 202a (e.g. one minute) will best reveal highlights 211a, while midtones 211b and shadows 211c will be under-developed. A laterscan (e.g. two minutes) will better reveal midtones 211b, while highlights 211a will become overdeveloped. Still later scans will better reveal shadows 211c at the expense of highlights 211a and midtones 211b. Thus, an image dataset comprising multiple timed-scans representing image elements (e.g. highlights, midtones and shadows covering a complete development time range is used to enable an accurate exposure of each element to be determined.

As shown in FIG. 3, a sufficient number of scans are taken such that the exposure of selected picture elements in each film layer can be deduced. Individual scans can further be combined for reducing memory utilization. (Scans 302 and 304, for example, can be combined to produce scan 308.)

FIGS. 3 through 5 illustrate examples of systems for combining image data contained in an image dataset ("stitching systems"). A key goal of such systems is to form, from the timed-scans in an image dataset, a resultant image dataset wherein each image element is represented at the brightness or "exposure" at which it was recorded onto film. For example, in the system of FIG. 3 (hereinafter referred to as "splice-stitching") an approximation is made as to the best exposure for each group of picture elements utilized (i.e. in this case, highlights, midtones and shadows). In addition, the groups are aligned, cut and pasted to form a single image. Unfortunately, approximating exposure values (which might be between available timed-scan data), such that each element is properly exposed and a visually continuous single image is formed, has been found to be computationally expensive and to yield inconsistent results.

FIG. 4 illustrates an alternative stitching system, referred to as "parametric-stitching," taught by a U.S. Patent Application entitled "Parametric Image Stitching" filed Feb. 22, 1999 and based upon Provisional Application No. 60/075, 562, which application is assigned to the same assignee as that of the present invention. Captured pixels within an image dataset are preferably used as image elements for stitching purposes. As described, timed-scan pixel data is tagged with a capture-time (i.e. a relative and/or absolute indicator of the time of each scan during film developing). Further, for each pixel at each scan-time, regression parameters are calculated and summed, the optimal density of each pixel position on the film is predicted, a gamma correction function is applied, and a brightness value for each pixel is determined. FIG. 4, for example, shows how different curves representing low, medium and high exposure timed-scans are preferably obtained for each pixel based upon a "best fit" of received pixel data for each of the different timed-scans, and an optimum density curve is empirically derived, as shown by dotted line 404. The actual best "brightness" (or "exposure") for a pixel is preferably determined based upon the intersection of the optimum density curve with the best fit curve corresponding to the pixel type (i.e. whether it was a low, mid or high exposure pixel).

Among the advantages of parametric-stitching over splice-stitching is the replacement of "pasting groups of picture elements together" with a more reliable model-based implementation (i.e. where the proper exposure of a pixel can be resolved without reference to the image as a whole)

FIG. 5 illustrates a still further image stitching system as taught by U.S. patent application Ser. No. 09/196,208 filed Nov. 20, 1999 entitled "Log-Time Processing and Stitching System" and is taken from FIG. 5A of that application. As with parametric-stitching, captured pixels within an image dataset are preferably used as image elements for stitching purposes.

In one aspect of this system (hereinafter referred to as "log-time stitching"), a regression analysis is performed that compares image data at various development times versus the natural log of time to obtain a best fit line of this data. The best-fit line is then used to determine a "b" value or "fitting constant" which preferably corresponds to the y-intercept of the best-fit line. It is discovered that this "b"

value is substantially directly proportional to the log exposure of a corresponding pixel. As is taught in another aspect of log-time stitching, a "b" value can be calculated using the principles of matrix algebra according to the following equation-1

$$\underbrace{\begin{bmatrix} N & \sum \ln(t) \\ \sum \ln(t) & \sum \ln(t)^2 \end{bmatrix}}_{A} \underbrace{\begin{bmatrix} b \\ m \end{bmatrix}}_{B} = \underbrace{\begin{bmatrix} \sum S \\ \sum S(\ln(t)) \end{bmatrix}}_{C} \quad \text{Equation 1}$$

wherein "N" represents a number of timed-scans made for a given film pixel (or given pixel of a single film layer in a multiple layer film), "t" represents each scan time relative to the start of film developing, "S" represents a detected signal value corresponding to the signal received from the sensor, "m" represents the slope of the best fit line, and "b," which is referred to as the "b value," is the y-intercept of the best fit line. Scan times can, as appropriate, be approximated as being equal for all pixels, such that matrix-A of equation-1 can be calculated once and then utilized for determining a "b" value for all pixels.

U.S. Pat. No. 5,519,510 and the Parametric Image Stitching application base upon U.S. Application Nos. 60/075,562 and U.S. application No. 09/196,208 are each expressly incorporated by reference herein.

While the above-described DFP capturing and stitching methods provide for more accurate image reproduction and/or processing of an image dataset, the resultant dataset has unfortunately been found to include a substantial amount of noise. More specifically, an undesirable signal distortion or "noise" (e.g. which is not present in a source image) is found to be contained in the image data produced through DFP-based image capturing and stitching. Further, such noise is found to be visually apparent in a final image, appearing as blotches when the final image is viewed.

A conventional approach to reducing the noise content in image data is to filter the image data. However, such an approach is also found to unreliably distinguish between desirable image data and undesirable noise. Thus, despite positive effects of filtering in removing noise, filtering also unfortunately tends to remove source image information and can therefore ultimately impede the ability of the DFP system to accurately reproduce a source image.

Accordingly, there remains a need for a system capable of utilizing DFP captured image data to provide resultant image data having a reduced amount of noise without substantially reducing the amount of image information.

SUMMARY OF THE INVENTION

The present invention includes a system capable of utilizing DFP captured image data to provide resultant image data having a reduced amount of noise without substantially reducing the amount of image information. Broadly stated, a stitching and processing system according to the invention identifies a replaceable portion of an image in an image dataset having a relatively high noise content and then replaces such portion with a replacement portion from another image dataset having lower noise content. The at least two datasets are preferably taken from the same source image such that a resulting image is substantially visually unaltered by the replacement except for a reduction in noise content.

In a preferred embodiment, at least two sets of timed-scan image data are received from a DFP image capturing system. More preferably, two image datasets are received which have been captured from the same source image. The first image dataset is hereinafter referred to as a "color-stitched image" and the second image dataset is hereinafter referred to as a "luminance image". Preferably, the color-stitched image corresponds to a conventionally taken number of timed-scans of a source image which timed-scans preferably range from when the source image is very under-developed to very over-developed. Also preferably, the luminance image corresponds to fewer timed-scans ranging from when source image from normally developed to very over-developed. Both received image datasets are preferably stitched, and more preferably, according to the log-time stitching system discussed in the above Background of the Invention. The stitched images are further preferably converted to a color space wherein image color data is separated from image non-color data, and more preferably, to L*a*b*, $YC_rC_b$, or other similar color space. Following stitching and conversion, the non-color data (e.g. the L* or luminance channel using an L*a*b* color space) of the luminance image is combined with the color data (e.g. the a* and b* or chrominance channels using L*a*b* space) of the color-stitched image.

Advantageously, a system according to the invention operates to provide a stitched image having substantially lower noise and otherwise not significantly affected source image reproduction characteristics as compared with existing systems.

These and other objects and advantages of the present invention will become apparent to those skilled in the art after considering the following detailed specification, together with the accompanying drawings.

DETAILED DESCRIPTION OF THE PREFERRED EMBODIMENT

Figure 1:
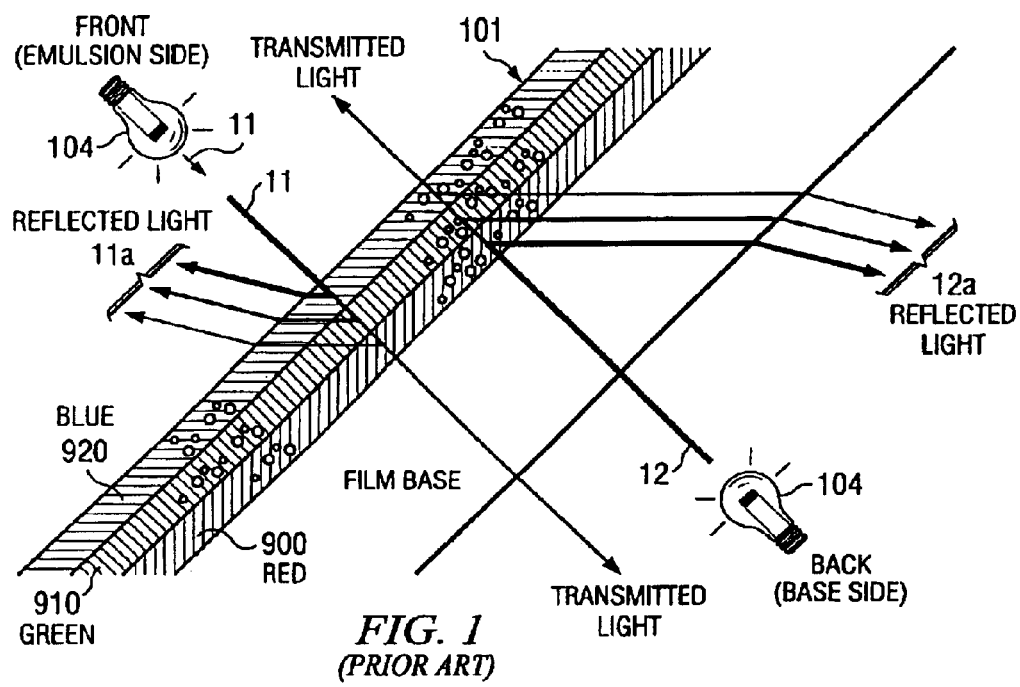
FIG. 1 is partial cutaway view illustrating prior art elements including modem photographic film and a digital film processing system for capturing an image from the photographic film.
Figure 4:
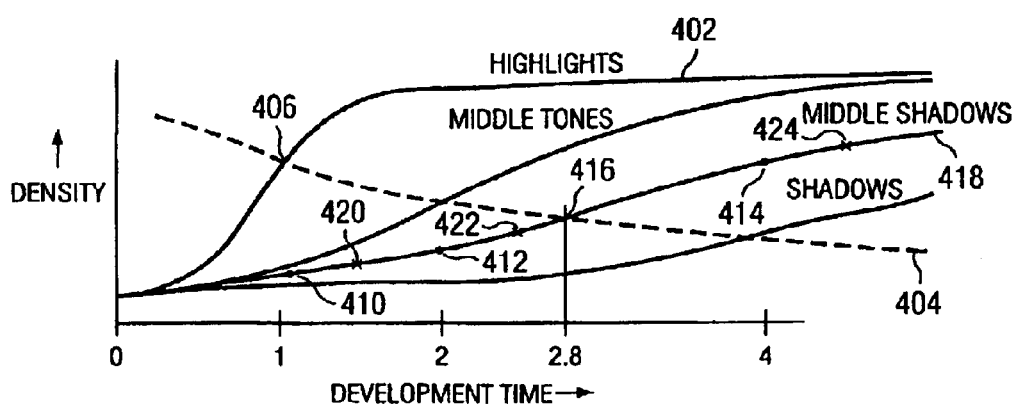
FIG. 4 illustrates how a prior art parametric-stitching system preferably stitches together film elements in an image dataset.

As discussed in the above Background of the Invention, image data produced by digital capturing and stitching techniques attempt to provide for increasing image reproduction accuracy. However, the image datasets that results from timed-scan image capturing and stitching techniques are nevertheless found to include undesirable noise content that is visibly apparent in a reproduced image.

The present invention attempts to reduce the amount of noise content in image data produced according to such techniques. For clarity sake, the following discussion will focus on a preferred system in which data is received using an image capturing system as described in the previously noted U.S. Pat. No. 5,519,510 and processed in accordance with techniques taught in the above-mentioned log-time stitching system of U.S. application Ser. No. 09/196,208. It will become apparent to those skilled in the art that other sources and techniques can also. be utilized.

As a preliminary matter, it is considered helpful in understanding the invention to first consider certain assumptions regarding accurate image reproduction that were initially made and have been found to be inaccurate. For example, one assumption was that the '510 patent taught that increasing the number of timed-scans would improve the definition of the resulting image. While increasing the number of timed-scans can improve the definition of the resulting image, it has been further discovered that the importance of greater numbers of timed-scans varies with respect to different image data components, and that each timed scan tends to introduce further noise into the image. Thus, some image data can be adequately represented using fewer timed-scans, and actually improve the image accuracy of the reproduced-image. A further assumption was that timed-scans taken early during film development (e.g. when the film containing the source image is very under-developed) are extremely important in order to accurately reproduce a source image. It is discovered, however, that only certain image data components tend to require such early timed-scans; other image data components can be produced from timed-scans representing a later and more limited film development-time range, again without substantial visual degradation of reproduced-image accuracy. A still further assumption was that image data is necessarily produced by stitching together data that was obtained from datasets obtained at the same time-scans. It is discovered, however, that a "composite image dataset" having a reduced noise content can be produced by selectively combining image data from time-scanned datasets obtained from different time-scans an image, such that certain portions of an image are obtained from time-scanned datasets that are different than timed scanned datasets used to obtain other portions of the same image.

For example, luminance and chrominance portions of the same image are required for accurate representation of a source image. It has been discovered that accurate reproduction of the chrominance portion requires the inclusion of timed-scans taken early in the film development in the stitching process. Accurate representation of the luminance portion, however, does not necessarily require the inclusion of early timed- scans. Rather, the luminance portion is considerably improved with the exclusion of an early timed-scan or early timed scans. In other words, the luminance portion more accurately represents the source image with a later and more limited film development-time range than that required for the chrominance portion.

As another example, the developer develops the exposed silver in the film at different rates. Because of these different rates, it is advantageous to use different sets of development times when stitching. In particular, the diffusion of the developer in the film causes the blue-sensitive layer to begin development first. The development of the green-sensitive and the red-sensitive layers follow. Further, the film chemistry within each color-sensitive layer is different. For instance, each color-sensitive layer has different organic dyes on the surface of the silver halide grains in order to capture different wavelengths of light. These dyes all have advantages and disadvantages in their use. Some dyes have the disadvantage of actually inhibiting the chemical development. For color-sensitive layers with such inhibiting sensitizing dyes, it is therefore desirable to have a different set of development times than for color-sensitive layers with non-inhibiting sensitizing dyes. Different color-sensitive layers also have differing amounts of anti-fogging agents, which also have development inhibiting properties. Again, it is therefore desirable to use different development times for different layers based on the amounts of anti-fogging agents.

Figure 6:
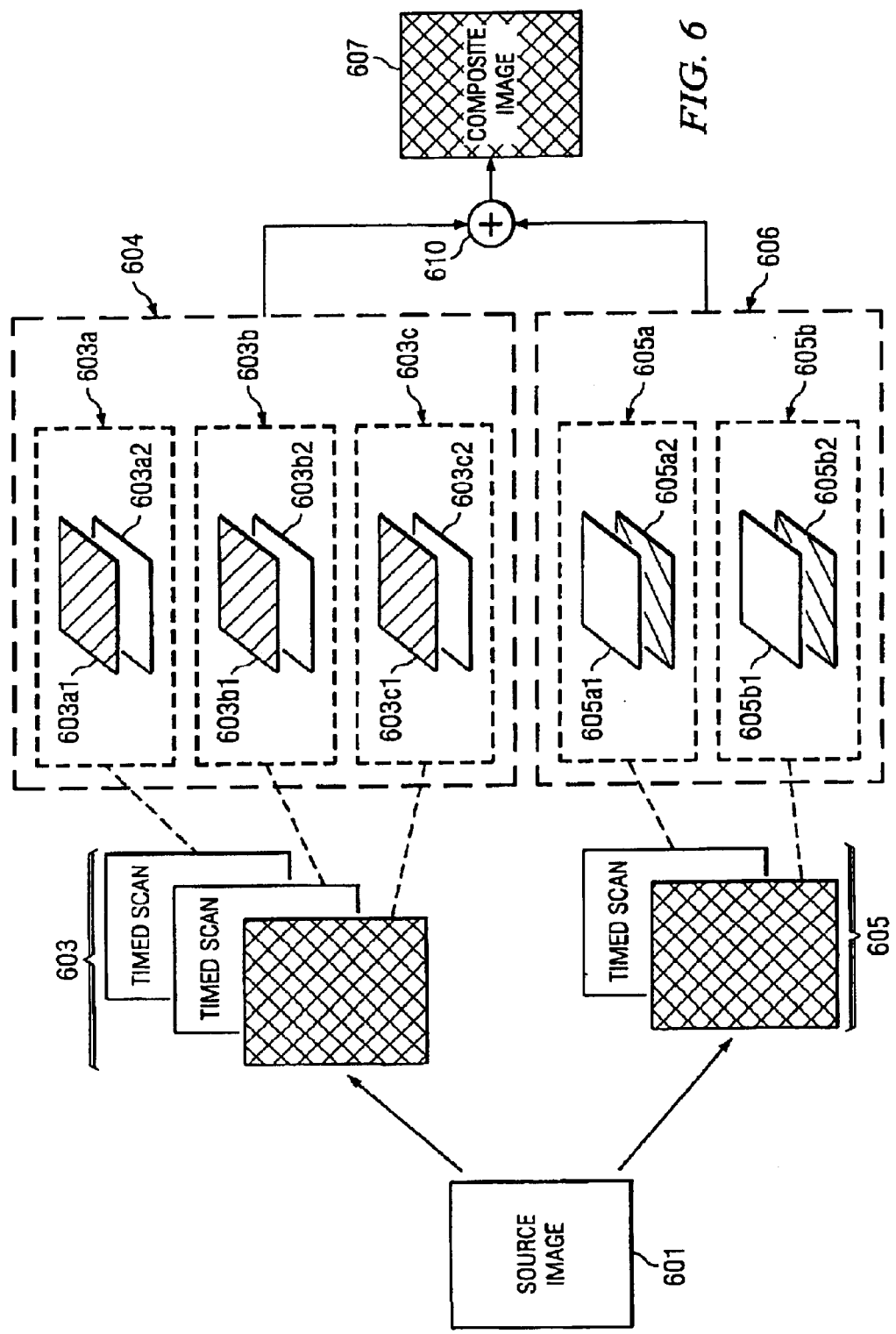
FIG. 6 illustrates an example of how a source image can be time-scanned to form more than one image-dataset, whereby data components of such datasets can be combined to form a composite image that more accurately reproduces the source image.

FIG. 6 illustrates how a source image 601 can be time-scanned to form two time-scanned datasets—dataset 603, which contains three timed-scans 603a, 603b, and 603c, and dataset 605, which contains two timed-scans 605a and 605b. While the data sets are described as being formed from timed scans that are mutually exclusive such that the timed scans in data set 603 are not in the timed scans of data set 605, this is done for purposes of ease of explanation. While these data sets can be formed from independent timed scans, there can be an overlap in the timed scans used, such that certain timed scans are used in both datasets 603 and 605. According to one aspect of the present invention, what is desired is that all of the timed scans used in the two data sets are not identical, such that exists an integer number M of timed scans for one dataset and an integer number N that is different from M of timed scans for the other dataset. Further, the "a," "b," and "c" designations represent different development times.

While the description provided hereinafter discusses the invention based upon there being two timed-scan datasets used for two different image portions, it will be apparent that three or even more different timed-scan datasets can be used, such that each different timed-scan dataset is used to obtain different portions of the final image, and then each of the different portions of the final image are ultimately combined to obtain the final image.

Each timed-scan within dataset 603 further contains separable first data components 603a1, 603b1, and 603c1 and second data components 603a2, 603b2, and 603c2. Similarly each timed-scan within dataset 605 contains separable first data components 605a1 and 605b1 and second data components 605a2 and 605b2. The designations "1" and "2" represent, for example, two separate color channels. Only two channels are shown in FIG. 6 for simplicity. More channels could be used according to the present invention. Three channels are preferred, which preferably represent reflection and transmission data as depicted in FIG. 1 (11, 11a, and 12a) such that front, back, and through data is obtained for each timed scan.

For each of data sets 603 and 605, the data components are stitched independently from each other, preferably on a pixel-by-pixel basis, resulting in two stitched "images" of the same image. Preferably, the log-time stitching procedure as taught in U.S. application Ser. No. 09/196,208 is used to obtain each stitched image, although other stitching procedures can be used as well. Each of the stitched images are converted to a color space characterized in that one channel represents the luminance of the source image, and two channels represent the chrominance of the source image. Examples of these color spaces include L*a*b* and YC$_r$C$_b$ spaces, both of which are described in color science textbooks, such as "A Technical Introduction to Digital Video", by Charles A Poynton.

The two chrominance channels from dataset 603 are then combined with the luminance channel from dataset 605 in combining step 610 to form the final image. For example, if L*a*b* color space was used for the two data sets, the a* and b* channels from data set 603 would be combined with the L* channel from dataset 605. For the color space, YC$_r$C$_b$, the C$_r$ and C$_b$ channels from dataset 603 would be combined with the Y channel from dataset 605 to form the final image. The final image can be further converted to other color spaces without any restrictions on this invention.

Figure 7:
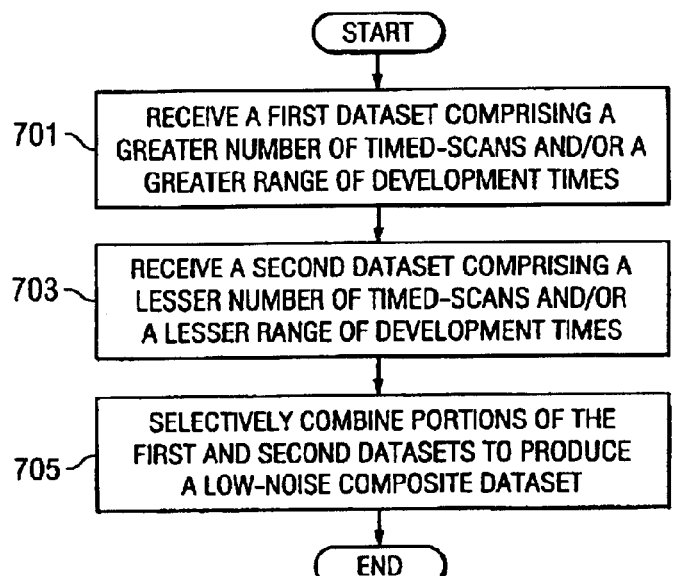
FIG. 7 is a flowchart illustrating a preferred stitching and noise-reduction method according to the invention.

Turning to FIG. 7, a preferred method for providing a final image having a low noise content in accordance with the above discoveries is broadly illustrated. As shown, in step 701, a first image dataset comprising a number of timed-scans and/or representing a range of development times is received. In step 703, a second image dataset comprising a lesser number of timed-scans and/or a dataset representing a lesser range of development times is received. More preferably, the second image dataset represents a lesser number of timed-scans taken over a later and lesser range of development times, thereby providing image data having a reduced noise content, but degraded color reproduction relative to the first image dataset in step 701. Finally, in step 705, selected components of data from the first and second image datasets are combined to form a composite image dataset.

As will become more apparent in the discussion that follows, a final image with greater color reproduction accuracy and lower noise content is achieved by creating appropriate different image portions from different data sets. Experimentation has, for example, shown that a resultant image dataset can be formed by combining a color information portion of the first dataset with a luminance portion of the second dataset. The resultant image dataset formed in this manner has been found to provide a accurately reproduced image having a reduced noise content. It is also anticipated that other combinations of data portions from multiple received image datasets will also produce varying degrees of low-noise, high accuracy resultant image datasets.

The usage of different image portions from different data sets is made possible, in part, due to the way that the human eye perceives color. Different cells within the human are responsible for sensing luminance and chrominance. Therefore, the luminance and chrominance components of images can be processed as different portions of the image and optimized independently from each other, thus resulting in a final image of superior quality. The majority of the noise which is perceived in an image is in the luminance component. The obtaining of multiple stitched images for one source image thus allows for the independent optimization of stitching parameters for different portions of an image, such as the luminance and chrominance components of a source image.

Figure 9:
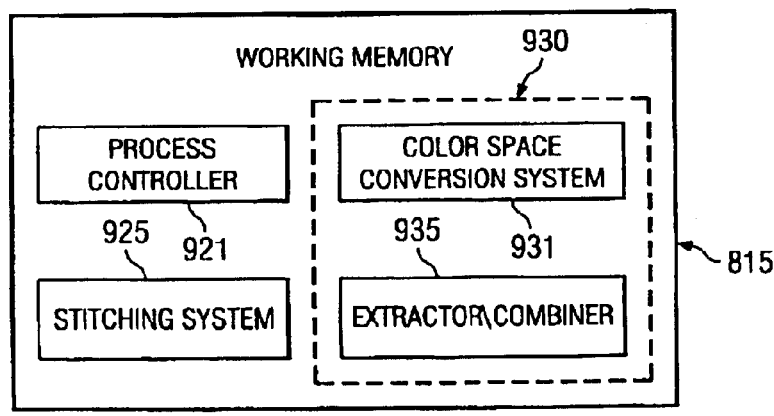
FIG. 9 is a functional block diagram illustrating, in more detail, the stitching and noise reduction system of FIG. 7.
Figure 8:
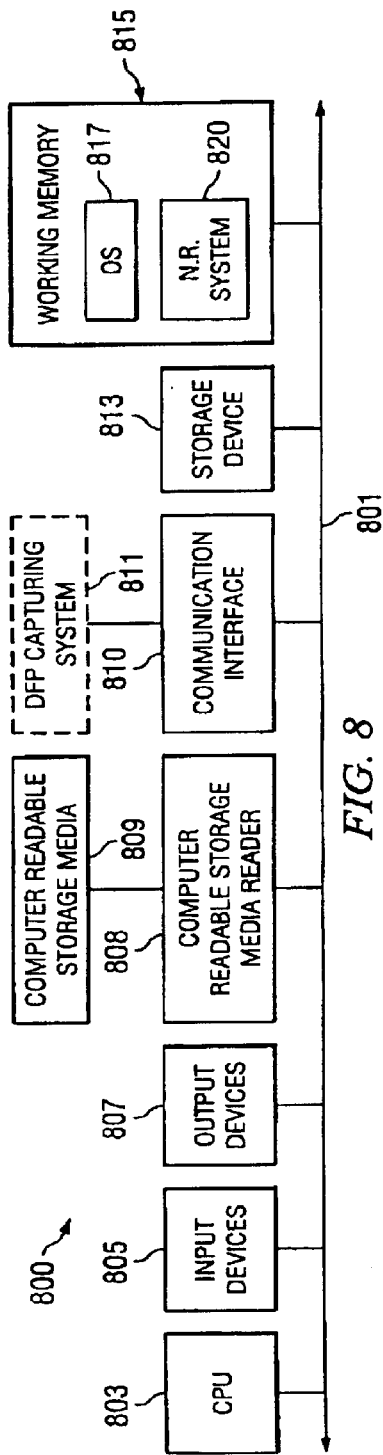
FIG. 8 is a functional block diagram illustrating a preferred stitching and noise-reduction system according to the invention.

Continuing with FIGS. 8 and 9, a mixed-channel stitching and noise reduction system ("noise-reduction system") is preferably implemented as computer readable code executed on a data processing system 800, such as a personal computer or "PC".

Beginning with FIG. 8, system 800 preferably comprises processing system elements coupled via bus 801 including CPU 803, input devices 805 and output devices 807, computer readable storage media reader 808, communications interface 810, storage device 813 and memory 815. Computer readable storage media reader 808 is further coupled to computer readable storage media 809, which combination preferably includes local and/or remote storage devices and/or memory and memory control functionality operable in combination with or alternatively with storage device 813 and/or memory 815. Communication interface 810 is further preferably coupled to digital film processing ("DFP") system 811, which DFP system preferably comprises a film development and scanning apparatus and methods in accordance with those taught by the above-mentioned U.S. Pat. No. 5,519,510. Memory 815 further comprises software elements including operating system 817 and noise-reduction system 820. (For clarity sake, conventionally well known hardware and software elements including but not limited to necessary interfaces and/or drivers have been omitted from the figure.)

Despite the specificity of the above description, however, it will be apparent to those skilled in the art that several variations of system 800 are likely, only a few of which might be specifically noted herein. For example, many elements, such as noise-reduction system 820 (and/or its component elements), can be implemented in software, hardware or a combination of both, and can further be implemented integrally to and/or independently from system 800. Another example is that such processing system alternatives as multiple systems, CPUs and/or digital signal processors ("DSPs") among others, might also be used. A further example is that sources of image data other than or in addition to a DFP system (e.g. stored, transferred and/or processed data) can be utilized. Communications interface 810 can still further comprise any number of wired and/or wireless connections to a local and/or wide area network, the internet and/or other connectable devices and/or systems. Such connections enable a vast array of data transfer, sharing, workload distribution, downloadable code and/or data, and other capabilities, as are continuously being introduced, advanced and more widely adopted. Various input and output devices can also be used however, output devices preferably include an image printer and at least one image viewing device, such as a CRT and/or flat panel display. Still further, various operating systems and data processing systems can be utilized. However, at least a conventional multitasking operating system such as Windows 95 or NT running on a Pentium II computer, are preferred and will be presumed for the discussion herein.

The FIG. 9 functional diagram illustrates, in more detail, the elements of noise-reduction system 820. As shown, noise-reduction system 820 preferably comprises communicatingly coupled elements including process controller 921, stitching system 925 and image-data substitution system 930. Image-data substitution system 930 further preferably comprises color-space conversion system 931 and extractor/combiner 935. Broadly stated, process controller 921 operates primarily as a main program that receives user input, conducts noise-reduction system configuration and launches or "instantiates" system 925 and 930 elements. Stitching system 925 preferably operates to receive timed-scan image datasets received from DFP capturing system 811 (FIG. 8) and to stitch together each received image set in accordance with the log-time apparatus and methods of the above-mentioned U.S. application Ser. No. 09/196,208. (However, as discussed earlier, other stitching apparatus and methods can also be utilized.) Color-space conversion system 931 and extractor/combiner 935 of image-data substitution system 930 preferably combine selected portions of stitched data to form a composite dataset. It should be noted, however, that capturing of image data need not be followed directly by stitching/noise-reduction as discussed herein and that intervening and/or following data manipulation (transfer, processing, etc.) is also contemplated. Further, noise-reduction system 820 can be integrated within a more extensive image processing system.

Figure 10:
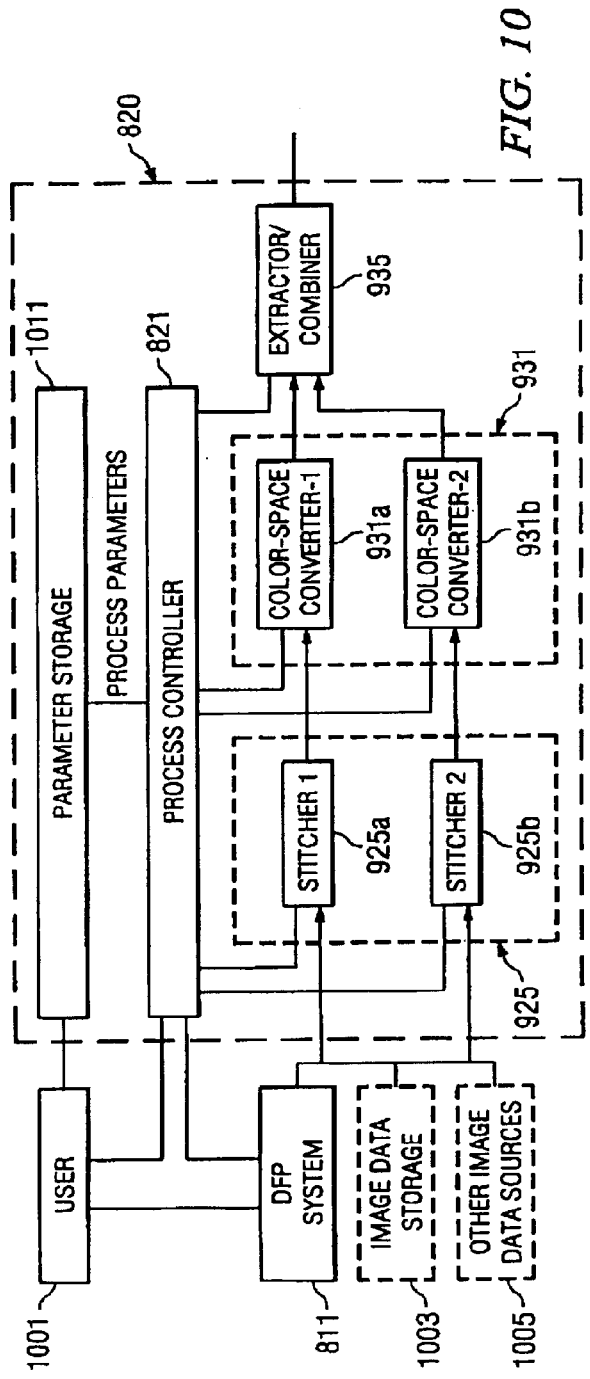
FIG. 10 is a functional block diagram illustrating, in even greater detail, the stitching and noise reduction system of FIGS. 7 and 8.

The FIG. 10 functional diagram illustrates, in more detail, the preferred noise reduction system of FIGS. 8 and 9. As shown, process controller 821 is coupled to subsystems including stitcher-1 925a, stitcher-2 925b, color-space converter-1 931a, color-space converter-2 931b and extractor/combiner 935, thereby providing for instantiation and control of such subsystems. Process controller 821 is further preferably coupled to DFP system 811, such that a DFP system serving multiple applications can be configured for providing image datasets in accordance with the invention, and to user control 901, thereby providing for user control and monitoring of system 820 operation. Parameter storage 811 is coupled to user control 1001 and process controller 821, thereby providing for storage and polling of pre-determined and/or user-determined image data processing parameters. Stitching system 925 comprises stitcher-1 925a and stitcher-2 925b, which are coupled to DFP system 811 and respectively to color-space converter-1 925a and color-space converter-2 925b of color-space conversion system 925. Color-space converter 931a and color-space converter-2 931b are coupled to extractor/combiner 935.

The illustrated noise-reduction system 820 configuration is preferred as providing a high degree of flexibility and robust performance. For example, process controller 821 preferably instantiates two stitchers and color-space converters, and an extractor/combiner for each source (i.e. each group of datasets to be processed) in accordance with the invention. System 820 is therefore capable of providing contemporaneous processing of multiple groups of received image datasets in instances (e.g. commercial applications) where higher capacity image processing is desirable. In addition, instantiation (as is often exploited in conventional applications) further facilitates such on-demand distributed processing utilizing the preferred (lower cost) software-only implementation, as well as (currently higher cost, but more robust) combined hardware and software implementations. User control 1001 and parameter storage 809 further provide for automatic and/or user-controllable image data manipulation. That is, user-control can be conventionally utilized by modifying processing parameters stored in parameter storage 809. Such combination further facilitates the integration of additional image processing techniques as might be desirably implemented in conjunction with stitching and noise reduction in accordance with the invention. It will be appreciated, however, that a wide variety of alternative implementations might also be used. Examples include but are not limited to hard coded subsystems (with or without modifiable parameters). It should also be apparent that image data can also be pre-processed to varying extents (e.g. pre-stitched) and then received directly by a corresponding subsystem.

Two image datasets are preferably received from DFP system 811. For ease of identification, these image datasets will be referred to respectively, in accordance with their preferred processing, as a "color-stitched (or chrominance) image" and a "luminance image". (It should be understood, however, that alternative processing in accordance with the invention is also expected and that no limitation should be inferred from such naming inventions.) As will be discussed further, a portion of the color-stitched image is preferably used to provide image color information, which has been found to require more extensive timed-scan information. Sufficient timed-scan information for the color stitched image and the optimal development times for each of the color-stitched and luminance images depend on the developer formulation and development temperature. For such purposes, developer HC-110 (Eastman Kodak Company) at a temperature of 23.5 C., was used to generate the data listed in Table 1.

TABLE 1

Summary of Noise and color Measurement Data for Timed-Scan Sets

| Timed-Scan Set | Luminance Image Development Times (mins) | Color-Stiched Image Development Times (mins) | Measured Noise | Measured Color Error |
|---|---|---|---|---|
| 1 | 2, 4, 8 | 2, 4, 8 | 0.866 | 10.96 |
| 2 | 1.5, 2, 4, 8 | 1.5, 2, 4, 8 | 0.955 | 8.15 |
| 3 | 2, 4, 8 | 1.5, 2, 4, 8 | 0.866 | 8.15 |
| 4 | 2, 4, 16 | 2, 4, 16 | 0.831 | 10.84 |
| 5 | 1.5, 2, 4, 8, 16 | 1.5, 2, 4, 8, 16 | 0.916 | 8.23 |
| 6 | 2, 4, 16 | 1.5, 2, 4, 8, 16 | 0.831 | 8.23 |

Figure 2A:
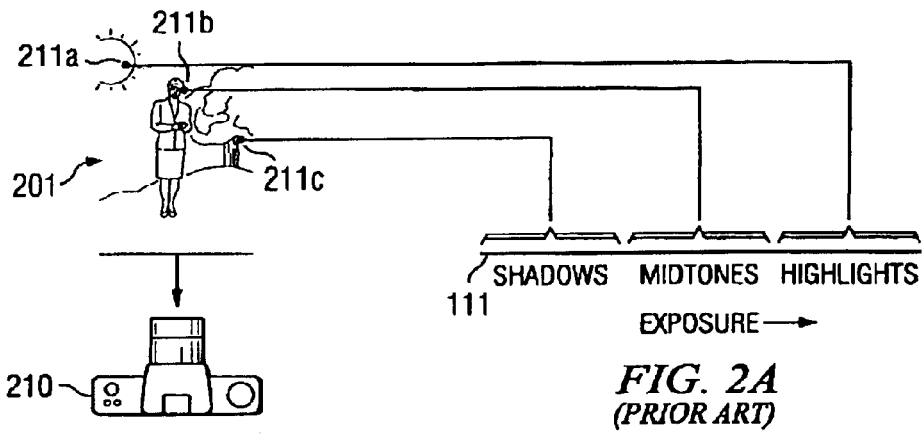
FIG. 2A illustrates how, in prior art digital film processing, a picture recorded on film is considered in terms of varying exposure picture elements including highlights, midtones and shadows.
Figure 2B:
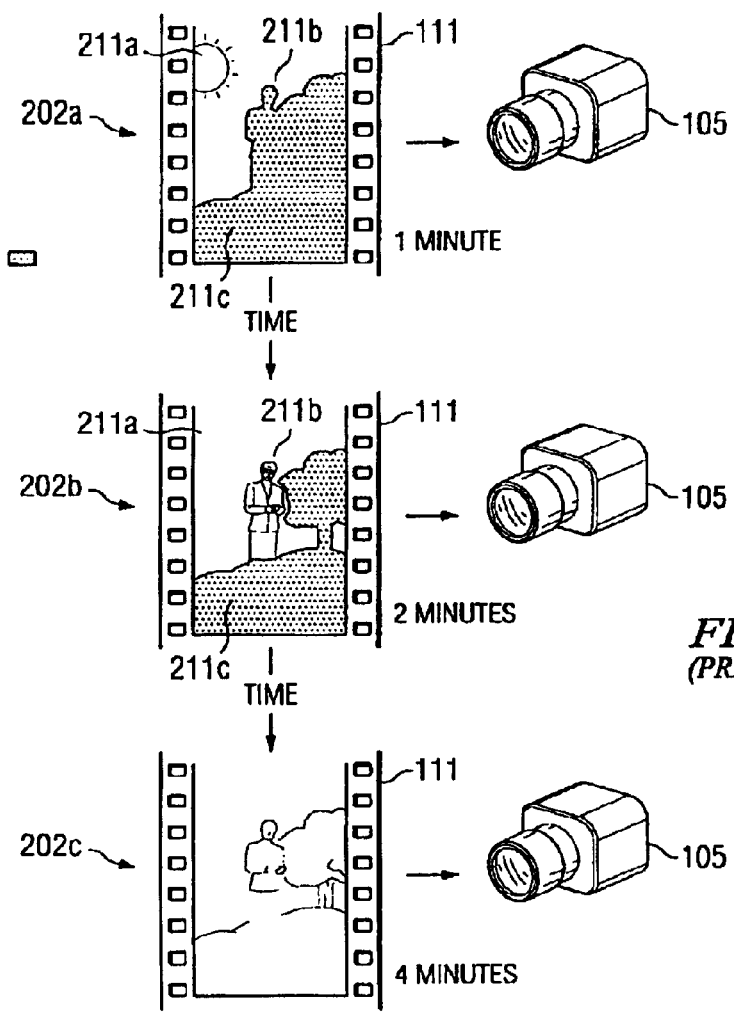
FIG. 2B illustrates how, in prior art digital film processing, timed-scans capture the varying exposure picture elements of FIG. 2A.
Figure 3:
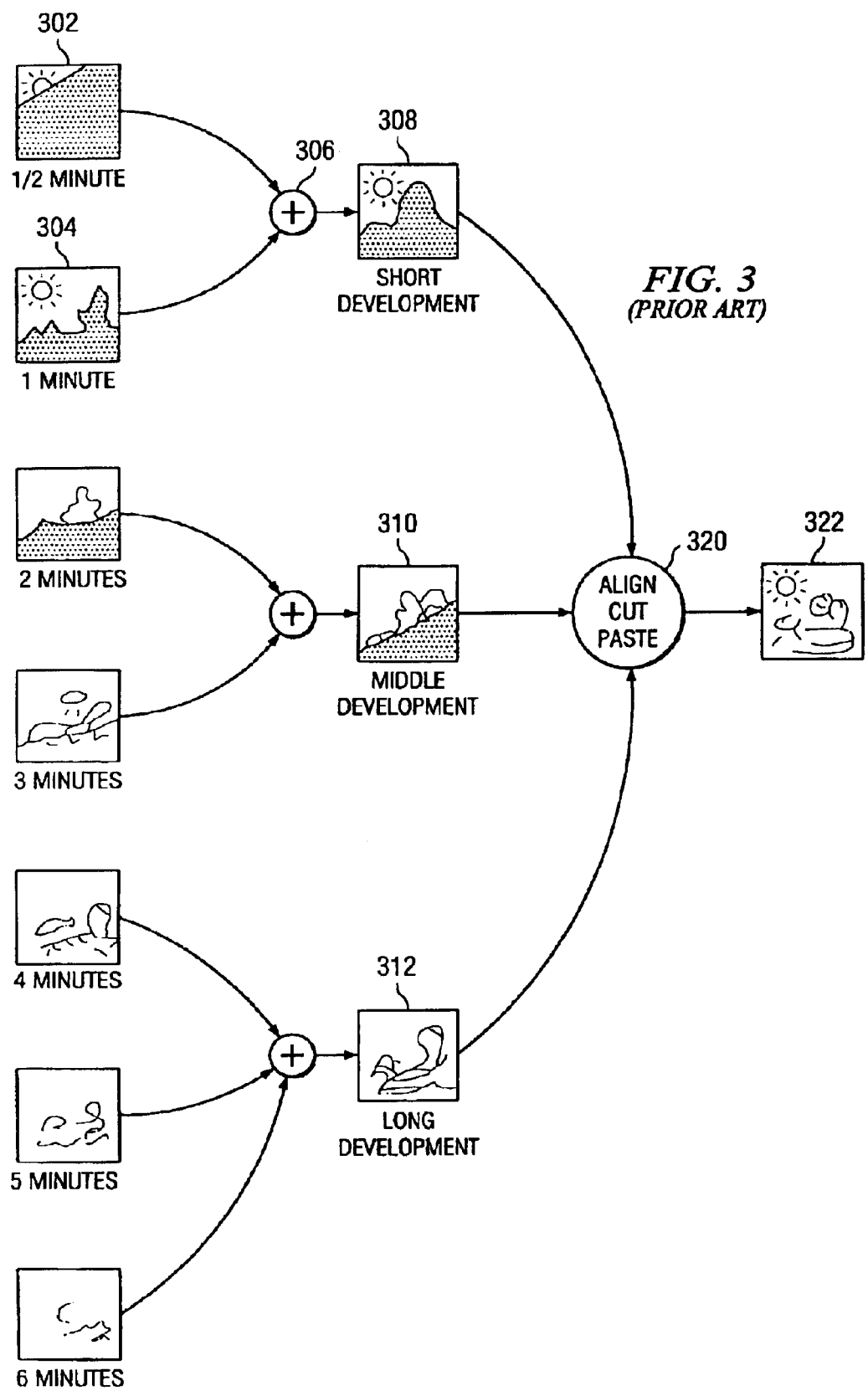
FIG. 3 illustrates how a prior art splice-stitching system preferably stitches together picture elements in an image dataset.
Figure 5:
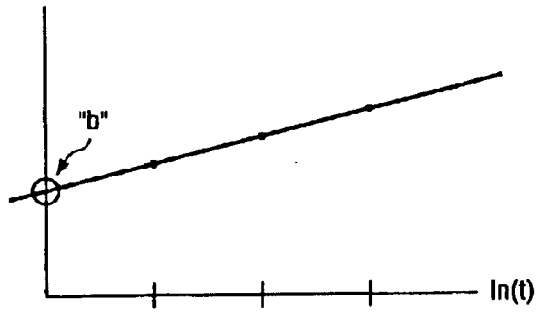
FIG. 5 illustrates how a prior art log-time stitching system preferably stitches together film elements in an image dataset.

Several images with an IT-8 color patch target (Eastman Kodak Company) was exposed to a roll of Kodak Gold 100 color negative film. The film was bath developed, each image for a different time. Each developed image was designed to emphasize highlights, mid-tones, and shadows as described in the Background of the Invention in reference to FIG. 2a. The developer was HC-110 (Eastman Kodak Company) and was used at 23.5 degrees C. The development times that were used are shown in Table 1. The measured noise in Table 1 is the average for the standard deviations calculated for each color patch in the target. The standard deviation was only calculated for the L* channel, since the luminance channel contains the vast majority of detail and noise information of images perceived by the human visual system. As the Measured Noise decreases, the image quality with respect to noise improves as perceived by the average viewer of the image.

The Measured Color Error is obtained by calculating the Euclidean distance between the measured a* and b* values and the target a* and b* values for each patch, and calculating the average of the Euclidean distances for all the patches. As the Measured Color Error decreases, the color patches in the image more accurately represent the true color of each patch on average. The Measured Color Error is sometimes referred to as $\Delta e^*$ in the art.

The image processing for the Timed-Scan Sets in Table 1 was performed using the log-stitching procedure described in U.S. application Ser. No. 09/196,208.

Timed-Scan Sets 1 and 2 show the data obtained for stitching three (2, 4, and 8 minutes) and four development times (1.5, 2, 4, and 8 minutes), whereby all of the data obtained was used to stitch a single image, which type of stitching is taught in one aspect of the log-stitching procedure of U.S. application Ser. No. 09/196,208.

Timed-Scan Set 3 was obtained by incorporating the teachings of the present invention, whereby two stitched images were obtained—one with three development times, 2, 4, and 8 minutes, (Luminance Image) and one with four development times, 1.5, 2, 4, and 8 minutes (Color-Stitched Image). Each of the two stitched images were converted to L*a*b* color space. The L* channel from the Luminance Image was combined with the a* and b* images from the Color-Stitched Image resulting in an image with better noise and color properties than either of Timed-Scan Set 1 or 2.

Timed-Scan Sets 4 and 5 show the data obtained for stitching three (2, 4, and 16 minutes) and five development times (1.5, 2, 4, 8, and 16 minutes), whereby all of the data obtained was used to stitch a single image, which type of stitching is taught in one aspect of the log-stitching procedure of U.S. application Ser. No. 09/196,208.

Timed-Scan Set 6 was obtained by incorporating the teachings of the present invention, whereby two stitched images were obtained—one with three development times, 2, 4, and 16 minutes, (Luminance Image) and one with five development times, 1.5, 2, 4, 8, and 16 minutes (Color-Stitched Image). Each of the stitched images were converted to L*a*b* color space. The L* channel from the Luminance Image was combined with the a* and b* images from the Color-Stitched Image resulting in an image with better noise and color properties than either of Timed-Scan Set 4 or 5.

Those skilled in the art will, however, appreciate that the specific characteristics of the color-stitched image can vary considerably in accordance with source image content, desired image reproduction accuracy, processing system throughput, user preferences and other considerations. In addition, it will become apparent that more than two images can also be utilized.

Operationally, process controller 821 preferably responds to receipt of image data by instantiating a stitcher, color-space converter and, in a first instance (i.e. for the first dataset in each group of datasets to be processed), an extractor/combiner. Process controller 821 further polls parameter storage for respective process parameters and configures each of these subsystems in a conventional manner.

Stitcher-1 925*a* and stitcher-2 925*b* preferably operate to separately receive datasets comprising timed-scan image data from DFP system 811 and to perform stitching on such datasets. More preferably, such stitching is performed in accordance with log-time stitching as taught by U.S. application Ser. No. 09/196,208. For example, stitcher-1 925*a*, having received a first image dataset, preferably stitches the dataset by determining a "b value" for each of three channels, red, green, and blue, for each pixel in accordance with the following equation-2

$$\begin{bmatrix} N & \sum \ln(t) \\ \sum \ln(t) & \sum \ln(t)^2 \end{bmatrix} \begin{bmatrix} b \\ m \end{bmatrix} = \begin{bmatrix} \sum S \\ \sum S(\ln(t)) \end{bmatrix} \quad \text{Equation 2}$$
$$\phantom{xxx}A \phantom{xxxxx} B \phantom{xxxxxx} C$$

as discussed in the above Background of the Invention. Once the "b" value has been determined for red, green, and blue channels, it is converted to either L*a*b*, YC$_r$C$_b$, or any other color space where one channel represents the luminance image information, and the other two channels represents the image chrominance information. Other image processing steps, such as stretching of the signal range or matrix correction, may also be applied without limitations to the invention. (Stitcher-b 925*b* preferably receives and stitches image datasets in the same manner.) Upon completion of stitching, stitcher-1 925*a* and stitcher-2 925*b* transfer the stitched datasets respectively to color-space converter-1 931*a* and color-space converter-2 931*b*. While other stitching techniques can also be used, the best experimental results to date have been achieved using log-time stitching. However, the specific stitching technique utilized is not critical to forming a low-noise resultant image dataset in accordance with the invention and other alternatives, including but not limited to those already discussed and/or combined existing and/or emerging stitching techniques, are also contemplated.

Color-space converter-1 931*a* and color-space converter-2 931*b* preferably operate separately to receive and convert stitched image datasets to a color space within which portions of the image datasets will be combined. An image dataset is typically provided by a DFP system (and other image capturing systems) in an RGB format or "color space" (i.e. red, green and blue image data are provided as separately identifiable data "channels"). Many other color spaces are also well known and might be utilized either as an intermediate format (during some other conversion) and/or for facilitating such color processing of the image dataset as color or noise filtering. Primarily for compatibility with existing devices, an image dataset (which has been converted) is typically converted back to an RGB color space prior to printing and/or display. (Further details regarding conventional color space usage and conversion can found in "A Technical Introduction to Digital Video", by Charles A Poynton.)

Color space conversion is preferably implemented by first converting a stitched image dataset (on a pixel-by-pixel basis) to a CIE XYZ color space in a conventional manner according to the following equation-3, $$\begin{bmatrix} X \\ Y \\ Z \end{bmatrix} = \begin{bmatrix} 0.412453 & 0.357580 & 0.180423 \\ 0.212671 & 0.715160 & 0.072169 \\ 0.019334 & 0.119193 & 0.950227 \end{bmatrix} \begin{bmatrix} R \\ G \\ B \end{bmatrix} \quad \text{Equation 3}$$

And then converting the XYZ formatted data (on a pixel-by-pixel basis) to an L*a*b* color space according to the following equations 4a through 4c. L* is determined using equation 4a, $$L^* = \begin{cases} \dfrac{Y}{Y_n} & \text{where } \dfrac{Y}{Y_n} \leq 0.008856 \\ 116\left(\dfrac{Y}{Y_n}\right)^{\frac{1}{3}} & \text{where } 0.008856 < \dfrac{Y}{Y_n} \end{cases} \quad \text{Equation 4a}$$

wherein $Y_n$ is the luminance of the white reference. a* is further preferably determined using equation 4b, $$a^* = 500\left[\left(\dfrac{X}{X_n}\right)^{\frac{1}{3}} - \left(\dfrac{Y}{Y_n}\right)^{\frac{1}{3}}\right] \quad \text{Equation 4b}$$

wherein $X_n$ is the X value for a white reference. Finally, b* is preferably determined using equation 4c $$b^* = 200\left[\left(\dfrac{Y}{Y_n}\right)^{\frac{1}{3}} - \left(\dfrac{Z}{Z_n}\right)^{\frac{1}{3}}\right] \quad \text{Equation 4c}$$

wherein $Z_n$ is the Z value for a white reference. The color-space converted, color-stitched image and luminance image are then preferably transferred to extractor/combiner 935.

Extractor/combiner 935 preferably operates to receive (color-space converted) color-stitched and luminance images and to combine these images thereby forming a resultant reduced noise image dataset. Such combination is preferably effectuated in accordance with the discovery that a portion of an image dataset is replaceable with a portion of another image dataset. More specifically, as discussed, the greater number of timed-scans and development times at which such timed-scans are taken in forming the color-stitched image would be expected to provide a substantially more accurate, though higher noise content image than the luminance image. However, it is discovered that a portion of the color-stitched image is replaceable by a portion of the luminance image and that such replacement can produce a resultant image having a lower noise content yet substantially the same image-reproduction accuracy as compared with the color-stitched image.

As discussed, extractor/combiner 935 preferably receives both the color-stitched and luminance images in an L*a*b* format. Consistently, extractor/combiner 935 preferably implements the above replacement by replacing the L* channel of the color stitched image with the L* channel of the luminance image. Similar results, however, are also contemplated, for example, where other luminance and color-information color spaces, still other color spaces and/or otherwise determined portions of a first, higher noise content image are replaced with portions of a second, lower noise content image. It is also expected that improved image reproduction results can also be achieved where more than two images are utilized. Examples include but are not limited to (e.g. in the preferred embodiment) replacing the L* channel of the color-stitched image with the L* channel of time luminance image and replacing the a* or b* channel of the color-stitched image with an a* or b* channel of a third image dataset.

Figure 11:
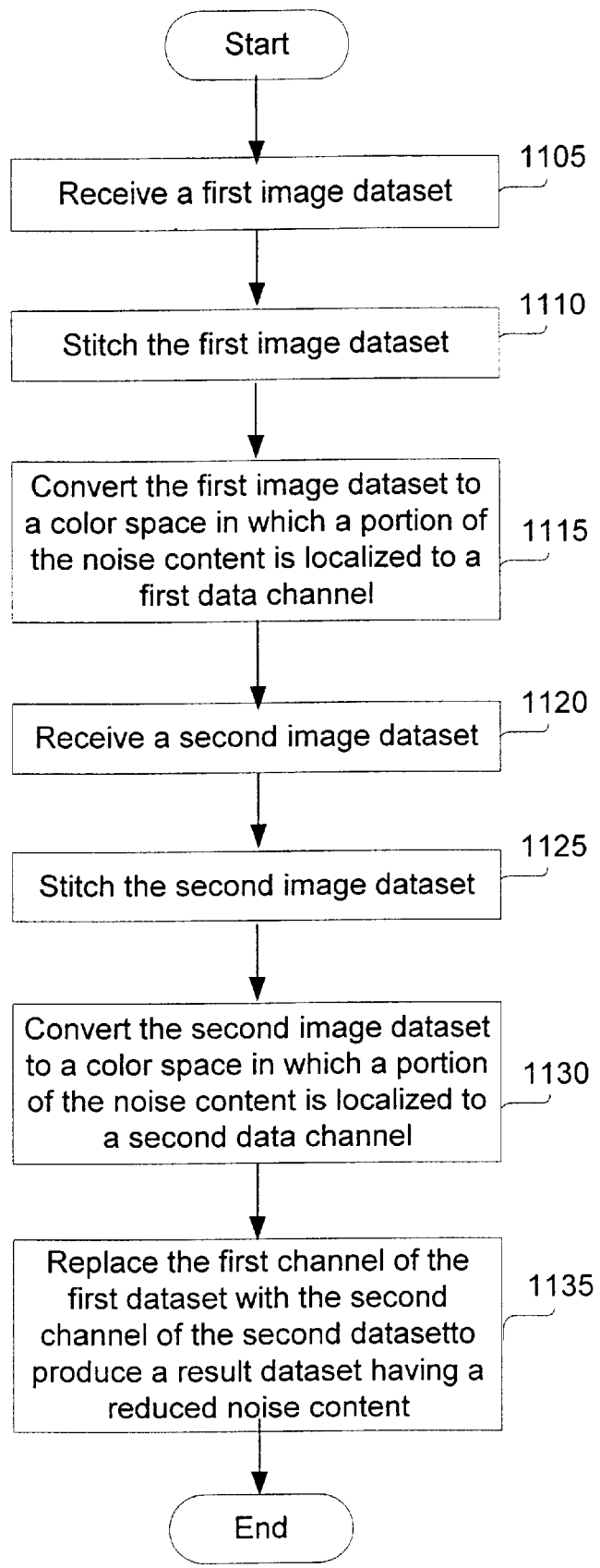
FIG. 11 is a flowchart illustrating a preferred stitching and noise reduction method according to the invention.

Turning to FIG. 11, a further preferred method for reducing the noise content of an image dataset is illustrated, which method preferably utilizes the system of FIG. 10. As shown, in step 1105, a first image dataset is received. In step 1110, the first image dataset is stitched, and, in step 1115, the first image dataset is converted to a color space in which a portion of the noise content is localized to a first channel. In step 1120, a second image dataset is received. As discussed, this second image dataset preferably has a lower noise content than the first image dataset. In step 1125, the second dataset is stitched, and, in step 1130, the second image dataset is converted to a color space in which a portion of the noise content is localized to a second data channel corresponding to the first dated channel of the first image dataset. Both the first image dataset and the second image dataset are preferably stitched using log-time stitching and converted to an L*a*b* color space. Finally, in step 1135, the first channel of the first image dataset is replaced with the second data channel of the second image dataset to produce a resultant image dataset having a reduced noise content (as compared with the first image dataset).

While the present invention has been described herein with reference to particular embodiments thereof, a latitude of modification, various changes and substitutions are intended in the foregoing disclosure, and it will be appreciated that in some instances some features of the invention will be employed without a corresponding use of other features without departing from the spirit and scope of the invention as set forth.

I claim:

1. A method of creating an image from a developing photographic negative comprising the steps of:
   stitching together a portion of an image using a plurality M of timed-scan data sets, said timed scan data sets obtained from scanning the developing photographic negative at a first range of different development times;
   stitching together another portion of the image using a plurality N of timed-scan data sets, said timed scan data sets obtained from scanning the developing photographic image at a second range of different development times which are less than the first range, wherein N is different from M; and
   combining the portion and the another portion to obtain the image.

2. A method according to claim 1 wherein M is greater than N.

3. A method according to claim 1 wherein the portion is a chrominance portion and the another portion is a luminance portion.

4. A method according to claim 3 wherein M is greater than N.

5. A method according to claim 1 wherein some of the timed-scans that make up the M timed-scan data set also are in the N timed-scan data sets.

6. A method according to claim 1 wherein all of the timed-scans that make up the M timed-scan data set also are in the N timed-scan data sets, and at least one additional timed-scan data set makes up the M timed-scan data sets.

7. A method according to claim 1 wherein none of the M timed-scan data sets are used to make up N timed-scan data sets.

8. A method according to claim 1 wherein the earliest of the timed-scan data sets used to make up the N timed-scan data sets is later than the earliest of timed-scan data sets used to make up the M timed-scan data sets.

9. A method of creating an image from a developing photographic negative comprising the steps of:
   stitching together a portion of an image using a plurality M of timed-scan data sets, said timed scan data sets obtained from scanning the developing photographic negative at different development times;
   stitching together another portion of the image using a plurality N of timed-scan data sets; said timed scan data sets obtained from scanning the developing photographic image at different development times, wherein the earliest of the timed-scan data sets used to make up the N timed-scan data sets is later than the earliest of timed-scan data sets used to make up the M timed-scan data sets; and
   combining the portion and the another portion to obtain the image.

10. A method according to claim 9 wherein M is greater than N.

11. A method according to claim 9 wherein the portion is a chrominance portion and the another portion is a luminance portion.

12. A method according to claim 11 wherein M is greater than N.

13. A method according to claim 9 wherein some of the timed-scans that make up the M timed-scan data set also are in the N timed-scan data sets.

14. A method according to claim 9 wherein all of the timed-scans that make up the M timed-scan data set also are in the N timed-scan data sets, and at least one additional timed-scan data set makes up the M timed-scan data sets.

15. A method according to claim 9 wherein none of the M timed-scan data sets are used to make up N timed-scan data sets.

16. A method of processing an image in which at least three timed-scans are obtained from a developing film, said method comprising the steps of:

creating a first portion of an image using a first timed-scan, a second timed-scan, and a third timed-scan, each of the first, second and third timed-scans being obtained at sequentially later points in time;

creating a second portion of an image using the second timed-scan and the third timed-scan, but not the first timed-scan;

combining the first portion and the second portion to obtain the image.

17. A method according to claim 16 wherein the first portion is a chrominance portion and the second portion is a luminance portion.

* * * * *